GEORGE REX.
Improvement in Apparatus for Carbureting Air.
No. 114,709. Patented May 9, 1871.
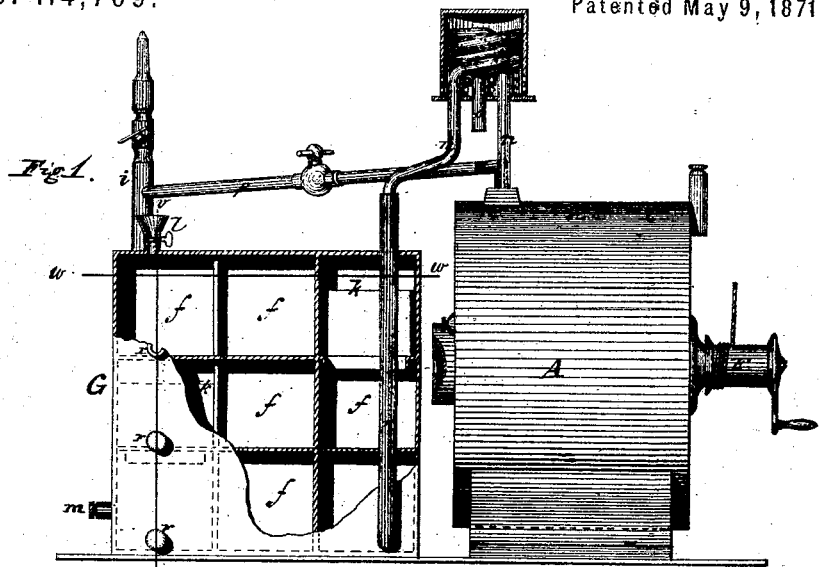
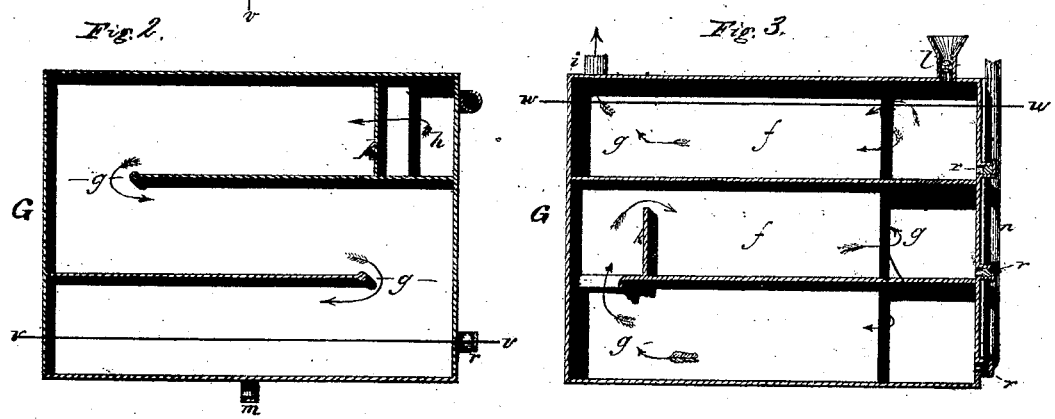
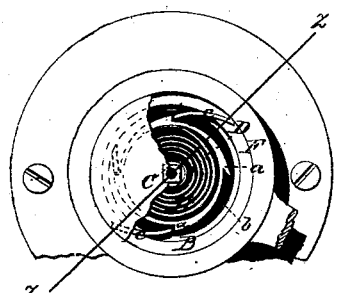
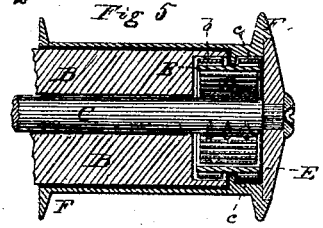
Witnesses
Harry King
Phil. T. Dodge
Inventor:
George Rex.
by Dodge & Munn.
Attys.

UNITED STATES PATENT OFFICE.

GEORGE REX, OF PHILADELPHIA, PENNSYLVANIA.

IMPROVEMENT IN APPARATUS FOR CARBURETING AIR.

Specification forming part of Letters Patent No. 114,709, dated May 9, 1871.

*To all whom it may concern:*

Be it known that I, GEORGE REX, of Philadelphia, in the county of Philadelphia and State of Pennsylvania, have invented certain Improvements in Carbureting-Machines, of which the following is a specification, reference being had to the accompanying drawings.

My invention relates to apparatus for carbureting air to produce a burning-gas for illuminating and other purposes; and it consists, first, in a novel arrangement of devices for driving the blower, whereby it is kept in motion while the weight or other motor is being wound up; and, second, in an improved manner of constructing the carbureting chamber or vessel.

Figure 1 is a side elevation of my apparatus complete, portions being broken away to show the interior. Fig. 2 is a horizontal section of the carbureting-vessel on the line $y\ y$. Fig. 3 is a vertical section of the same on the line $v\ v$, and Figs. 4 and 5 are respectively an end view and a section of the power-retaining devices through which the blower is operated.

A represents a rotary blower for forcing air through the carburetor. This blower may be of any suitable construction, as my invention relates merely to devices for operating it.

To one end of the blower is rigidly secured a neck or journal, B, through and beyond which the main shaft C of the blower extends, as shown in Figs. 4 and 5.

Around the outer end of the blower shaft C is placed a flat coiled spring, D, with its inner end secured to the shaft, and around the spring is placed a flat ring or band, E, to which the outer end of the spring is secured. The outside of the band E is formed with ratchet-teeth, $a$, and to the end of neck B are secured two spring pawls or catches, $b$, which engage into the teeth of band E, as shown.

On the neck B is slipped loosely a hollow drum or sleeve, F, which extends out around the ring E, and to the inside of this drum are attached two spring-pawls, $c$, which engage with the toothed face of band E, as shown. Around the outside of drum F is wound a rope or chain, G, as shown in Fig. 1, which passes off and suspends a weight in the usual manner, so that the weight will serve to unwind the rope, and thereby turn the drum toward the left. As the drum turns its pawls $c$ engage with and turn the ring or band E, which winds the spring and causes the latter to turn the blower-shaft C.

It will be seen that the ring and spring serve merely as a connection between the drum and the shaft, and that the spring remains wound up or partially so all the time the drum is being turned by the rope. When the rope or chain has become unwound from the drum F the latter is turned by means of a hand-crank toward the right, so as to wind the rope on again. While this is being done the pawls $c$ of the drum slide loosely around the outside of the ring E, and at the same time the pawls $b$ of neck B prevent the ring from turning, so that the spring, which now uncoils, will continue to turn the blower-shaft. When the cord is wound on the drum and the crank released the drum again turns toward the left, the pawls $c$ turn the ring, as before, wind up the spring, and carry the blower-shaft around, as before. By this arrangement it will be seen that the shaft is kept continuously in motion and not allowed to stop while the rope of the weight is being rewound on the drum, as is the case in all machines heretofore constructed.

G represents the carburetor, consisting of a tight rectangular vessel, provided inside with two horizontal partitions, $d$, and several vertical partitions, $e$, by which the vessel is divided into nine parallel horizontal passages, $f$, as shown in Figs. 1, 2, and 3. The passages $f$, as shown, are arranged in three series or tiers of three each, one tier above the other.

Openings $g$ are made through the vertical partitions $e$, so as to connect the passages $f$ in each tier with each other; and openings $h$ are made through the horizontal partitions $d$, so as to connect the passage in each tier with one in the tier above. The openings $g$ and $h$ are so located that air entering one of the lower passages, $f$, will pass through the same lengthwise, and then through the adjoining passages of that tier, and then up and through the three passages of the next tier, and finally through the three top passages and out through pipe $i$, provided for the purpose. Thus it will be seen that in passing through the vessel the air is compelled to travel back and forth across the same nine times.

Above and close by the side of each of the openings $h$, across the passage $f$, is placed a partition or weir, $k$, of nearly the full height of the passage. The passages $f$ are filled with sponge, cotton-waste, or similar material, and then gasoline or other suitable liquid is poured into the vessel through a cock, $l$, provided for the purpose at the top, as shown in Figs. 1 and 3. The gasoline rises in the three upper passages, $f$, until level with the top of the weir $k$ therein. It then flows over the weir and down through opening $h$ into the three middle passages, which are filled in like manner level with their weir, and then down into the three bottom passages. A cock, $m$, is applied to the vessel at the height it is desired to have the gasoline stand in the lower passages, so that by leaving this cock open when filling the vessel the attendant may know when the gasoline has reached the proper height, as it will then begin to blow out through the cock.

The blower I connect with the carburetor by a pipe, $n$, entering the latter at the lower corner below the level of the gasoline, as shown in Figs. 1 and 3. The pipe $n$ between the blower and the carburetor I form into a coil, and under this coil I place a burner, $o$, supplied with gas from the apparatus, so as to heat the coil, and thereby the air passing through it, so that the air enters the carburetor in a heated condition.

The heated air, being forced through the numerous passages of the carburetor through and over the saturated sponge, becomes thoroughly impregnated with the vapor of the gasoline, and issues from the vessel through pipe $i$ in the form of a highly-combustible gas, suitable for illuminating and heating purposes.

The delivery or escape pipe $i$ is connected by a pipe, $p$, provided with a cock, with the blower A, so that when necessary or desirable cold air may be conveyed from the blower into the delivery-pipe, so as to mingle with the gas therein.

Through the side of the carburetor, just above each of the horizontal partitions, a cock or thumb-screw, $r$, is introduced, so that when desired the gasoline may be drawn off through them and the vessel washed out.

I am aware that a retaining-power has before been applied to gas-machines and also to other machines, and therefore I do not claim such broadly; but,

Having thus described my invention, what I claim is—

1. The retaining-power, consisting of the spring D and ratchet-ring E, with the pawls $b\ c$, located within the drum F on the main shaft C of the fan, substantially as described.

2. The carburetor G, having its compartments and its supply and escape pipes arranged as described, in combination with the blower, having the retaining-power applied as above set forth, the whole constituting a new and improved machine for producing gas from hydrocarbons, as herein described.

GEORGE REX.

Witnesses:
L. SCHUTTE,
WILLIAM RAEUCHLE.